United States Patent
Graf et al.

(10) Patent No.: US 8,988,140 B2
(45) Date of Patent: Mar. 24, 2015

(54) REAL-TIME ADAPTIVE VOLTAGE CONTROL OF LOGIC BLOCKS

(71) Applicant: International Business Machines Corporation, Armonk, NY (US)

(72) Inventors: Richard S. Graf, Gray, ME (US); Joseph A. Iadanza, Hinesburg, VT (US); Faraydon Pakbaz, Milton, VT (US); Jack R. Smith, South Burlington, VT (US); Sebastian T. Ventrone, South Burlington, VT (US); Ivan L. Wemple, Shelburne, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/930,092

(22) Filed: Jun. 28, 2013

(65) Prior Publication Data
US 2015/0002217 A1    Jan. 1, 2015

(51) Int. Cl.
G05F 1/10    (2006.01)
G05F 1/46    (2006.01)

(52) U.S. Cl.
CPC ........................................ G05F 1/46 (2013.01)
USPC ........................................ 327/540; 323/267

(58) Field of Classification Search
CPC ............. G05F 1/10; G05F 1/46; G05F 1/462; G05F 1/466; G05F 1/59; G05F 1/577; G05F 1/61–1/618
USPC ........................................................... 323/267
See application file for complete search history.

(56) References Cited

U.S. PATENT DOCUMENTS

| | | | |
|---|---|---|---|
| 5,397,979 A | 3/1995 | Yamamoto | |
| 5,812,860 A | 9/1998 | Horden et al. | |
| 6,211,727 B1 * | 4/2001 | Carobolante | 327/543 |
| 6,236,194 B1 * | 5/2001 | Manabe et al. | 323/274 |
| 6,425,086 B1 | 7/2002 | Clark et al. | |
| 6,477,654 B1 | 11/2002 | Dean et al. | |
| 6,653,891 B1 * | 11/2003 | Hazucha | 327/540 |
| 6,996,730 B2 | 2/2006 | Bonnett | |
| 7,155,352 B2 | 12/2006 | Schoenborn | |
| 7,327,630 B2 * | 2/2008 | Park | 365/226 |
| 7,514,911 B2 | 4/2009 | Sutardja | |

(Continued)

OTHER PUBLICATIONS

Vladimir Zolotov et al., "Voltage Binning Under Process Variation", ICCAD 09, pp. 1-8.

*Primary Examiner* — Thomas J Hiltunen
(74) *Attorney, Agent, or Firm* — Gibb & Riley, LLC; David A. Cain, Esq.

(57) ABSTRACT

An integrated circuit includes logic regions and dynamically adjustable voltage controllers. A voltage controller connected to each logic region enables voltage adjustment while the chip is operating. Each voltage controller has a selector device connected to voltage input lines providing different voltages. A voltage sensor connected to the output of the selector device provides a supply voltage to one of the logic regions. A control circuit dynamically monitors the supply voltage, captures and stores a digital representation of the supply voltage during each cycle of a clock, and tracks variations over time, based on operation of the logic regions. When variations in the supply voltage exceed an operational threshold of one of the logic regions, the control circuit submits a request to a central controller. When the central controller grants permission, the control circuit dynamically adjusts the voltage by enabling the selector device to choose a different voltage input line.

19 Claims, 17 Drawing Sheets

(56) References Cited

U.S. PATENT DOCUMENTS

| | | |
|---|---|---|
| 7,639,033 B2 | 12/2009 | Rahim et al. |
| 7,681,054 B2 | 3/2010 | Ghiasi et al. |
| 7,720,621 B2 | 5/2010 | Weekly |
| 7,760,577 B1 | 7/2010 | Koay et al. |
| 7,782,125 B2* | 8/2010 | Shimura ................... 327/544 |
| 7,921,312 B1* | 4/2011 | Pennanen et al. ............ 713/300 |
| 7,941,682 B2 | 5/2011 | Adams |
| 7,960,958 B2 | 6/2011 | Sutardja |
| 8,051,307 B2 | 11/2011 | Huang et al. |
| 8,386,988 B2* | 2/2013 | Nomura ................... 716/133 |
| 2003/0079151 A1 | 4/2003 | Bohrer et al. |
| 2007/0085558 A1 | 4/2007 | Rahim et al. |
| 2009/0049314 A1 | 2/2009 | Taha et al. |
| 2010/0308897 A1* | 12/2010 | Evoy et al. ................... 327/530 |
| 2011/0063020 A1* | 3/2011 | Kim et al. ................... 327/538 |
| 2011/0187419 A1* | 8/2011 | Ikenaga et al. ............... 327/117 |
| 2011/0191607 A1 | 8/2011 | Gunther et al. |
| 2011/0260783 A1* | 10/2011 | Kawasaki ................... 327/540 |
| 2012/0005513 A1 | 1/2012 | Brock et al. |
| 2012/0159203 A1 | 6/2012 | Gervais et al. |
| 2012/0185705 A1 | 7/2012 | Luo et al. |
| 2012/0218005 A1* | 8/2012 | Chua-Eoan et al. .......... 327/107 |
| 2013/0195496 A1* | 8/2013 | Yamazawa ................... 399/88 |
| 2014/0070879 A1* | 3/2014 | Kawasaki ................... 327/543 |

* cited by examiner

REAL-TIME ADAPTIVE VOLTAGE CONTROL OF LOGIC BLOCKS

BACKGROUND

The present disclosure relates to integrated circuits, and more specifically, to devices and methods to provide an independent power supply to each region of the integrated circuit.

Today's integrated circuits have a variety of power, thermal, and workload requirements. Prior art includes methods to vary the frequency and the bias of circuits. Voltage Islands are becoming more commonly used in the industry. However, today's islands are limited to a single fixed power supply voltage, therefore the optimum voltage may not be available on a time domain perspective.

SUMMARY

Methods and systems herein relate to providing dynamically adjustable voltage value setting for each logic region on a chip in order to better optimize the power/heat/work load requirements.

Methods and systems herein create alternative implementations for adjusting the power supply voltage to a physical logic region on a chip, such that the voltage is dynamically increased or decreased in real time by an internal controller based on the amount of work being performed by the logic circuits. Several real-time voltage controllers are distributed across the chip area, such that each one controller selects an appropriate voltage for a region of logic. When the controller detects an increase in the work being done by its particular region, it increases the voltage to that region to allow maximum performance per clock cycle. Similarly, when the controller detects lower activity, it decreases the voltage to the region to reduce power dissipation. The controller is able to detect workload changes by monitoring the local power supply voltage over time. Increasing workload appears as a voltage droop, while decreasing activity results in voltage rising.

According to a device herein, a semiconductor comprises logic regions and voltage controllers. Each of the voltage controllers is operatively connected to one of the logic regions. Each of the voltage controllers comprises a selector device having inputs and a single output. Voltage input lines are operatively connected to the inputs of the selector device. Each voltage input line provides a different voltage. A voltage sensing device is operatively connected to the single output of the selector device. The single output provides a supply voltage to the one of the logic regions. A control circuit is operatively connected to the selector device. The voltage sensing device senses the supply voltage. The control circuit captures and stores a digital representation of the supply voltage during each cycle of a clock. The control circuit tracks variations in the supply voltage over time based on operation of the one of the logic regions. Responsive to the variations in the supply voltage exceeding an operational threshold of the one of the logic regions, the control circuit enables the selector device to choose a different voltage input line to adjust the supply voltage up or down.

According to a voltage controller device herein, a selector device has inputs and a single output. Voltage input lines are operatively connected to the inputs of the selector device. Each of the voltage input line provides a different voltage. A voltage sensing device is operatively connected to the single output of the selector device. A control circuit is operatively connected to the selector device. The voltage sensing device senses a voltage of the single output. The control circuit captures and stores a digital representation of the voltage during each cycle of a clock. The control circuit tracks variations in the voltage over time. Responsive to the variations in the voltage exceeding a threshold, the control circuit enables the selector device to choose a different voltage input line to adjust the voltage up or down.

According to a method herein, voltage input lines, operatively connected to inputs of a selector device, are provided. Each voltage input line provides a different voltage. The selector device provides a single supply voltage to a logic region of an integrated circuit from one of the voltage input lines. Variations in the supply voltage are tracked, over time, based on operation of the logic region. A threshold is defined for the variations in the supply voltage for the logic region. Upon the variations in the supply voltage reaching the threshold, the selector device provides the supply voltage from a different voltage input line in order to adjust the supply voltage for the logic region higher or lower, while the integrated circuit is functioning.

BRIEF DESCRIPTION OF THE DRAWINGS

The devices and methods herein will be better understood from the following detailed description with reference to the drawings, which are not necessarily drawn to scale and in which.

DETAILED DESCRIPTION

Figure 1:
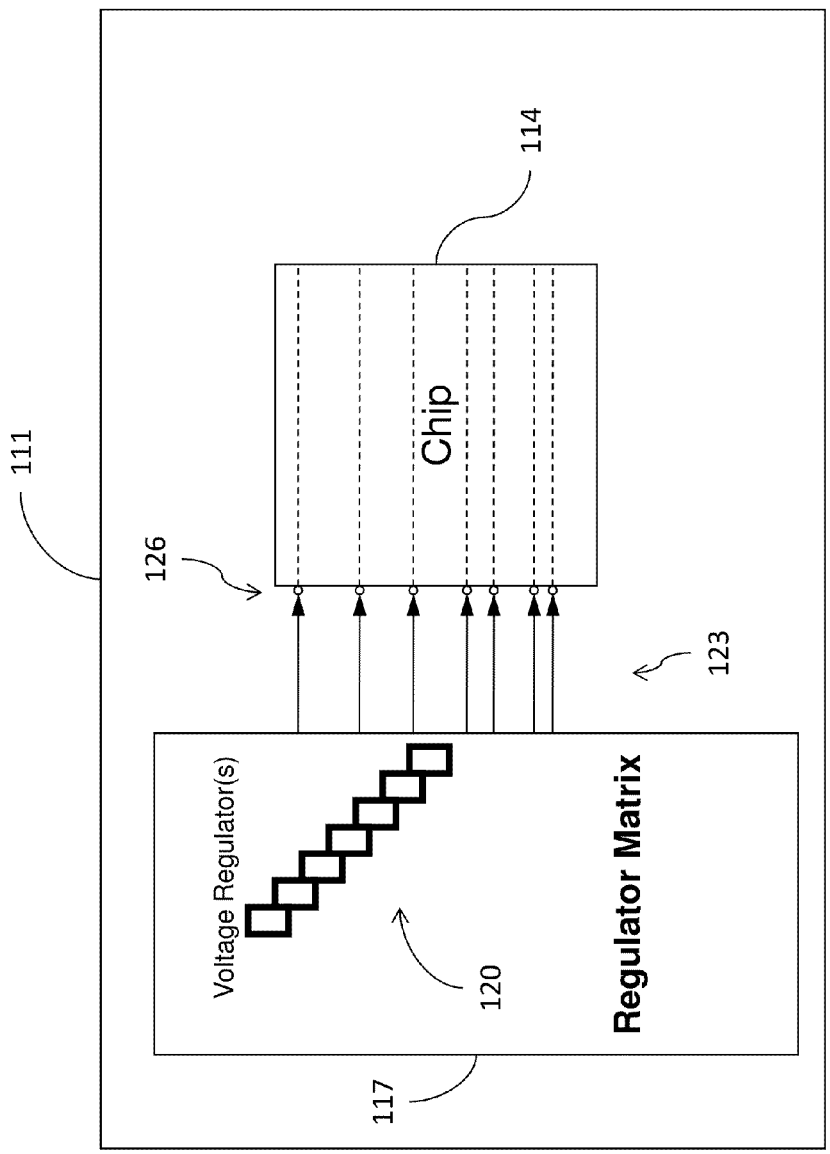
FIG. 1 is a block diagram of a semiconductor device according to devices and methods herein.

It will be readily understood that the devices and methods of the present disclosure, as generally described and illustrated in the drawings herein, may be arranged and designed in a wide variety of different configurations in addition to the devices and methods described herein. Thus, the following detailed description of the devices and methods, as represented in the drawings, is not intended to limit the scope defined by the appended claims, but is merely representative of selected devices and methods. The following description is intended only by way of example, and simply illustrates certain concepts of the devices and methods, as disclosed and claimed herein.

Referring now to the drawings, FIG. 1 shows a semiconductor device illustrated by a board 111 having at least one chip 114 disposed thereon. According to devices and methods herein the chip 114 is a silicon chip. The board 111 may also include a regulator matrix 117 for providing power to circuits on the chip 114. The regulator matrix 117 includes a plurality of voltage regulators, indicated generally as 120. Each of the voltage regulators 120 provides a separate voltage. The voltage regulators 120 are electrically connected to the chip 114 by the voltage supply lines 123. Physical connection to the chip 114 may be accomplished through controlled collapse chip connections (C4s) 126, or by other devices, as would be known by one ordinarily skilled in the art. According to devices and methods herein, the voltage regulators 120 generate a set of adjustable voltages for the system and the regulator matrix 117 connects the outputs from the voltage regulators 120 to specific power pins of the chip 114.

Figure 2:
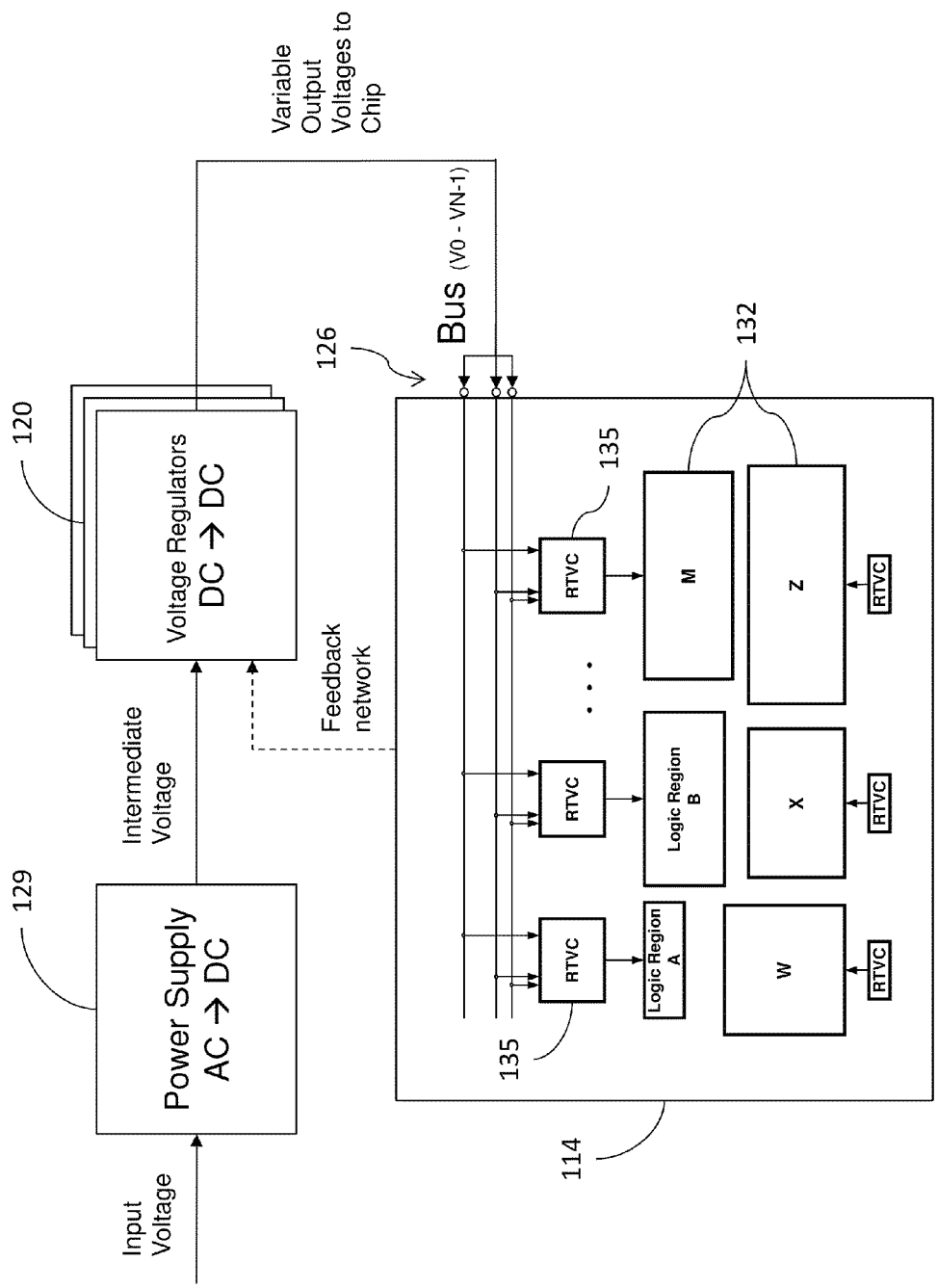
FIG. 2 is a block diagram illustrating real-time self-adaptive voltage controllers according to devices and methods herein.

FIG. 2 shows a system level view of real-time self-adaptive voltage controllers according to devices and methods herein. Typically, as shown in FIG. 2, an AC input voltage is supplied to a system power supply 129, which converts the AC voltage to some intermediate DC voltage. The intermediate DC voltage is adjusted by the voltage regulators 120 of the regulator matrix 117, which provide separate voltages (V0-VN−1) to the chip 114. The chip 114 includes a plurality of logic regions 132 disposed thereon. Each logic region 132 has a separate real-time voltage controller (RTVC) 135, the operation of which is described in more detail below.

Figure 3:
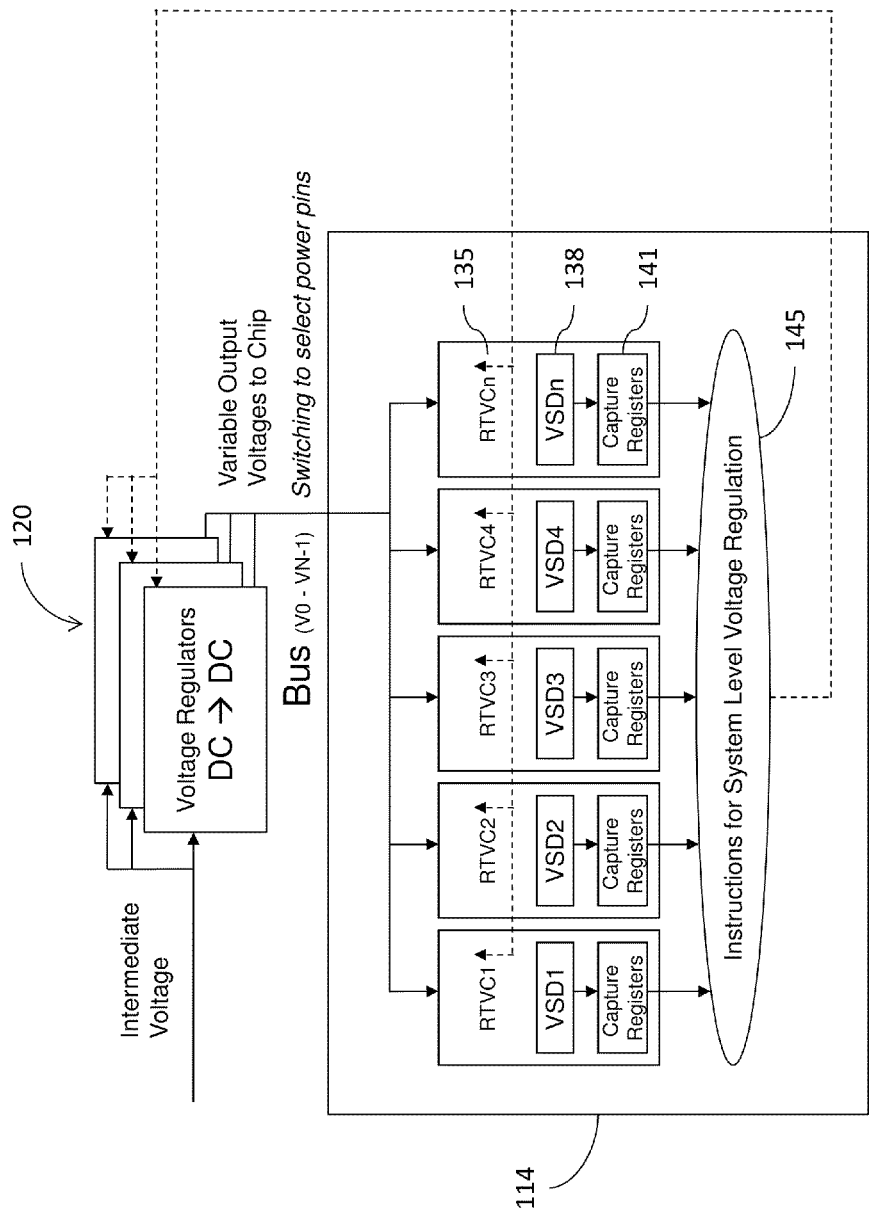
FIG. 3 is a block diagram illustrating real-time self-adaptive voltage controllers according to devices and methods herein.

Each RTVC 135 includes a voltage sensing device (VSD) 138 and one or more capture registers 141, as shown in FIG. 3. The RTVC 135 selects a particular power supply for each logic region 132 on the chip 114. The RTVC 135 safely changes the voltage for the logic regions 132 by choosing an appropriate voltage bus V0-VN−1 to supply a voltage to the logic regions 132. A process 145, comprising instructions for system level voltage regulation, which is described in more detail below, is used to adjust system level voltage input to the chip 114, and to adjust each RTVC 135 on the chip 114, accordingly.

Figure 4:
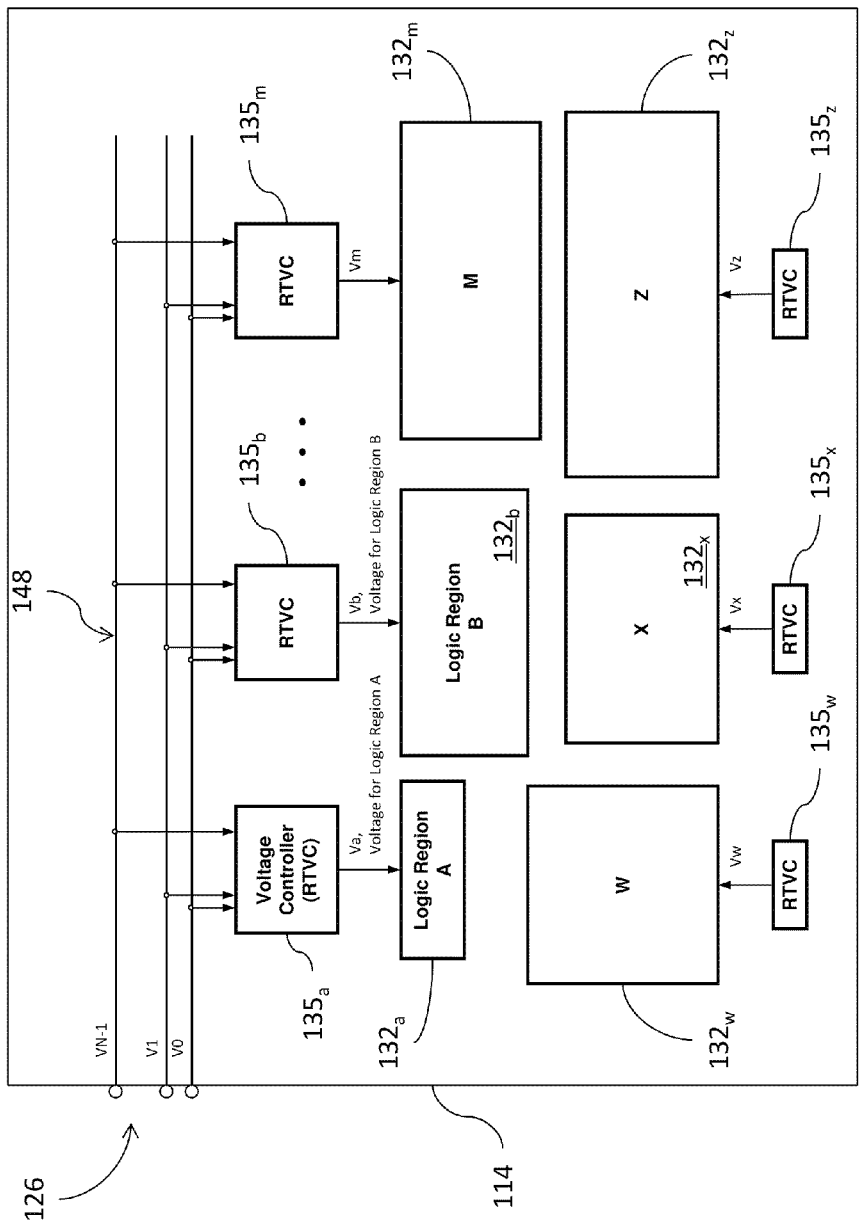
FIG. 4 is a block diagram illustrating multiple logic regions according to devices and methods herein.

Referring to FIG. 4, multiple logic regions 132 are physically placed across the chip 114. Real-Time Voltage Controllers (RTVC) 135 are distributed across the chip 114, each one placed near its associated logic region 132. There may be N voltage input lines 148 supplied to the chip 114. As described above, the voltage input lines 148 may be connected to the voltage regulators 120 through C4s 126, or by other devices as would be know by one ordinarily skilled in the art. Each of the voltage input lines 148 may provide a different voltage (V0-VN−1) to each RTVC 135. The examples illustrated herein have N supply rails (V0-VN−1) representing N different voltage levels. It is contemplated that some devices herein may connect the same voltage to two or more rails; for example, rails V0, V2, and V5 may operate at the same voltage level. Each RTVC 135 has an independent power supply connection to each logic region 132. The RTVC 135 dynamically adjusts the supply voltage individually for its logic region 132 based on workload of its logic region. As shown in FIG. 4, Va is the voltage for Logic Region A; Vb is the voltage for Logic Region B; etc.

Figure 5:
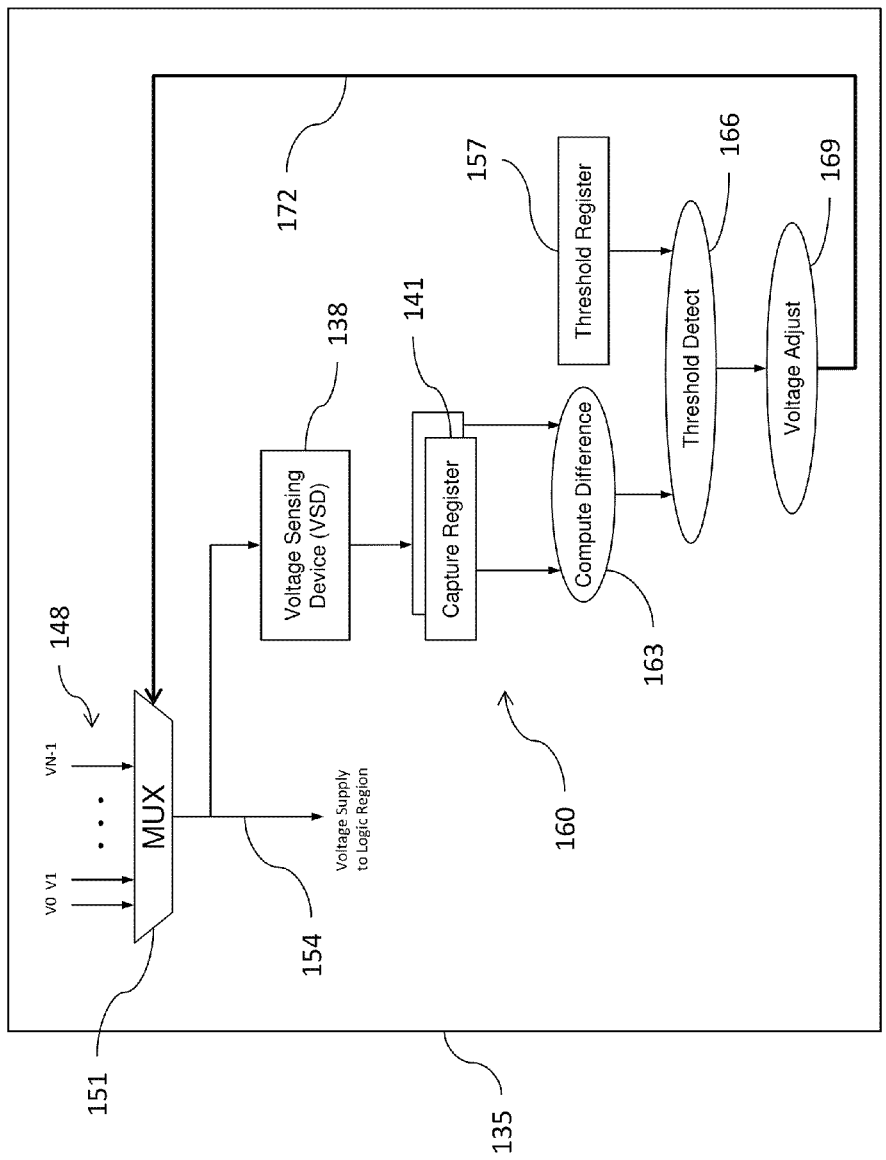
FIG. 5 is a block diagram illustrating a Real-Time Voltage Controller (RTVC) according to devices and methods herein.

FIG. 5 shows a Real-Time Voltage Controller (RTVC) 135 according to devices and methods herein. Each RTVC 135 contains a selector device 151 having inputs from each of the voltage input lines 148 and a single output. As shown in FIG. 5, the selector device 151 may be a multiplexer device (MUX). The inputs comprise all of the different voltages (V0-VN−1) from the voltage input lines 148. While FIG. 5 shows the selector device 151 connected to all the voltage input lines 148, it is contemplated that different ones of the selector device 151 could be connected to only some of the voltage input lines 148. In other words, different areas of the chip 114 could be operating in different voltage ranges, such that a single set of regulators providing all sub-voltages within the specified ranges.

The single output provides the local supply voltage 154 to one of the logic regions 132. The selector device 151 selects one of N supply voltages for the logic region 132. Each RTVC 135 contains a Voltage Sensing Device (VSD) 138. One non-limiting example of a voltage sensing device is a TVSENSE core. Other devices can be used. The VSD 138 is attached to the local supply voltage 154 of the logic region. The VSD 138 captures a digital representation of the local supply voltage 154 in each clock cycle and outputs a digital representation of the local supply voltage 154. The Capture Register 141 receives a snapshot of the output of the VSD 138 every clock cycle. Each RTVC 135 contains a Threshold Register 157 that holds a value indicating the maximum amount that the local supply voltage 154 can vary before the system adjusts the local supply voltage 154 to a different level (higher or lower). The threshold value may be individually programmable for each RTVC 135. Each RTVC 135 includes a control circuit 160 having logic that observes the value in the Capture Register 141. The captured output of the VSD 138 is monitored over many clock cycles. The control circuit 160 computes the difference 163 of the value in the Capture Register 141 over time. The control circuit 160 detects 166 when the difference exceeds the value in the Threshold Register 157. If the voltage variation exceeds the threshold value, then a voltage adjust function 169 of the control circuit 160 provides a SELECT signal 172 to the selector device 151. The SELECT signal 172 directs the selector device 151 to choose a different voltage input line 148 in order to adjust the local supply voltage 154 up or down. Until the voltage variation exceeds the threshold value, each RTVC 135 maintains its SELECT 172 signal at a constant value until a particular RTVC 135 has been individually granted permission to adjust the voltage supplied to the logic region 132 associated with the particular RTVC 135. The request and grant protocol for voltage adjustment is described in further detail below.

Figure 6:
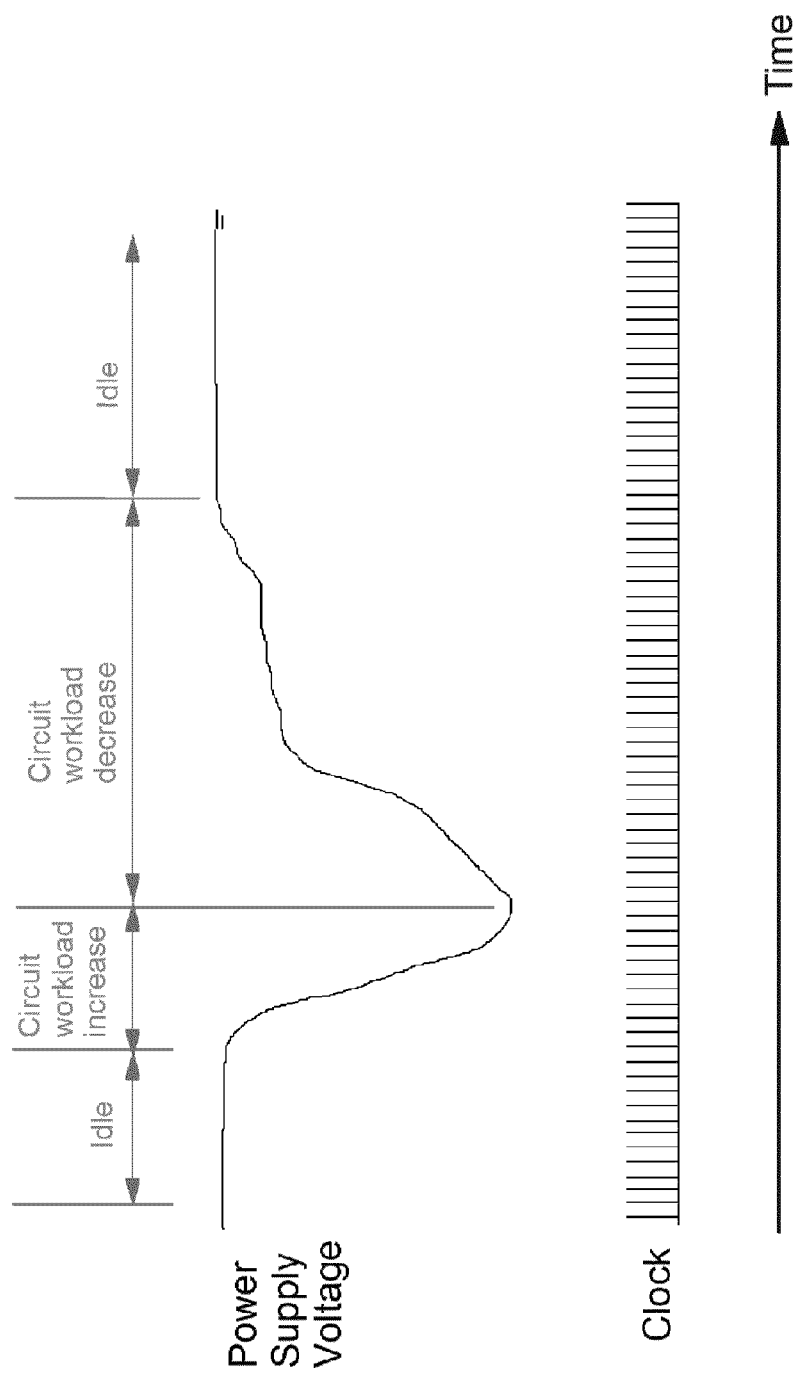
FIG. 6 is a timing diagram illustrating various aspects of devices and methods herein.

FIG. 6 illustrates a typical waveform of a power supply for a logic region. Notice that the supply voltage droops as the logic circuit's activity increases, which corresponds to greater workload. The supply voltage increases as the workload decreases.

Figure 7:
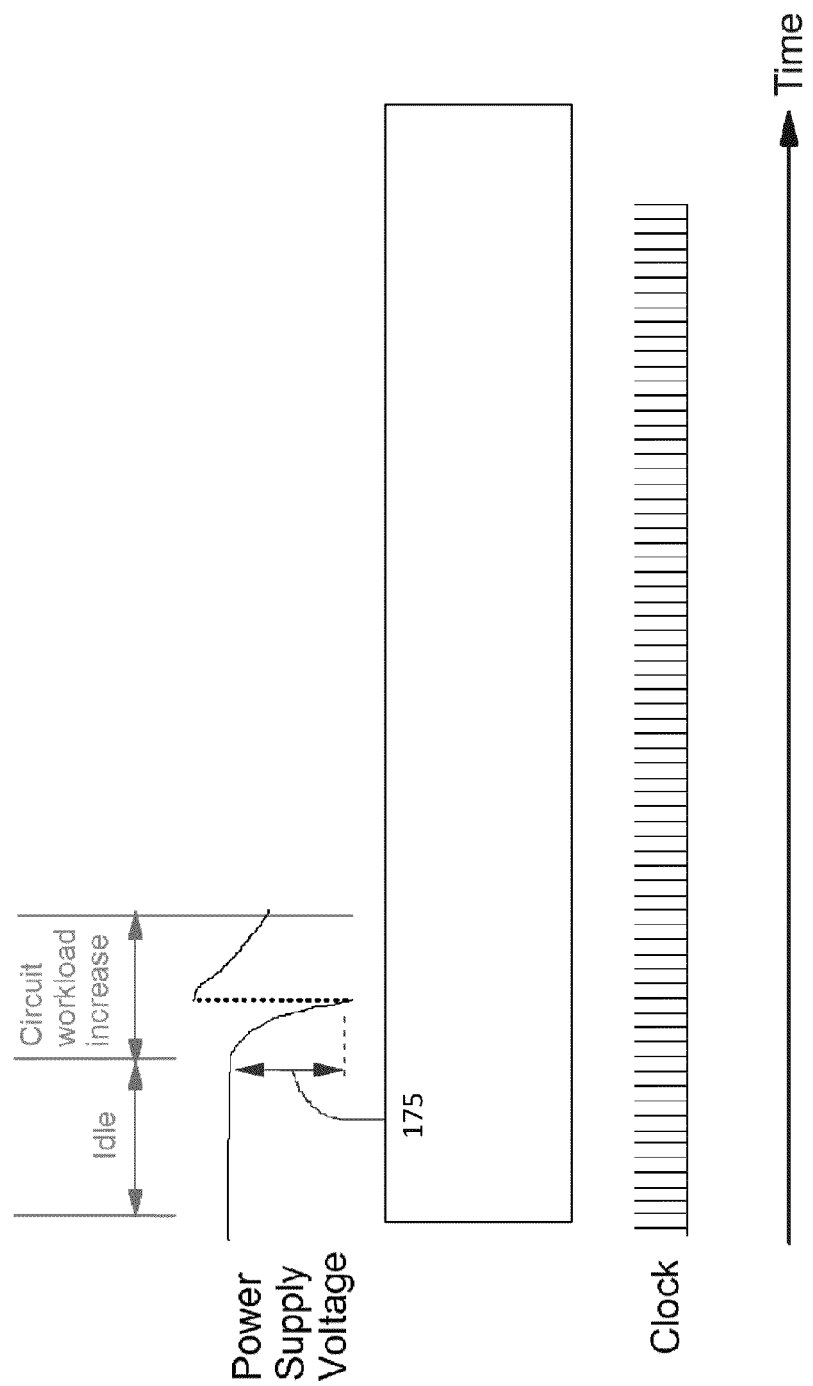
FIG. 7 is a timing diagram illustrating various aspects of devices and methods herein.

FIG. 7 illustrates an example of dynamic power supply voltage adjustment based on workload according to devices and methods herein. The high workload causes the voltage droop to exceed the selected threshold value, as indicated at 175. The voltage adjust function 169 provides a SELECT signal 172 to the selector device 151, directing the selector device 151 to choose a voltage input line 148 with a higher voltage in turn to adjust the local supply voltage 154 up, in order to meet the workload demand. Such voltage adjustment allows operating the logic at a higher frequency during peak workload conditions enabling maximum performance. Similarly, when the controller detects lower activity, it decreases the voltage to the region in order to reduce power dissipation.

Figure 8:
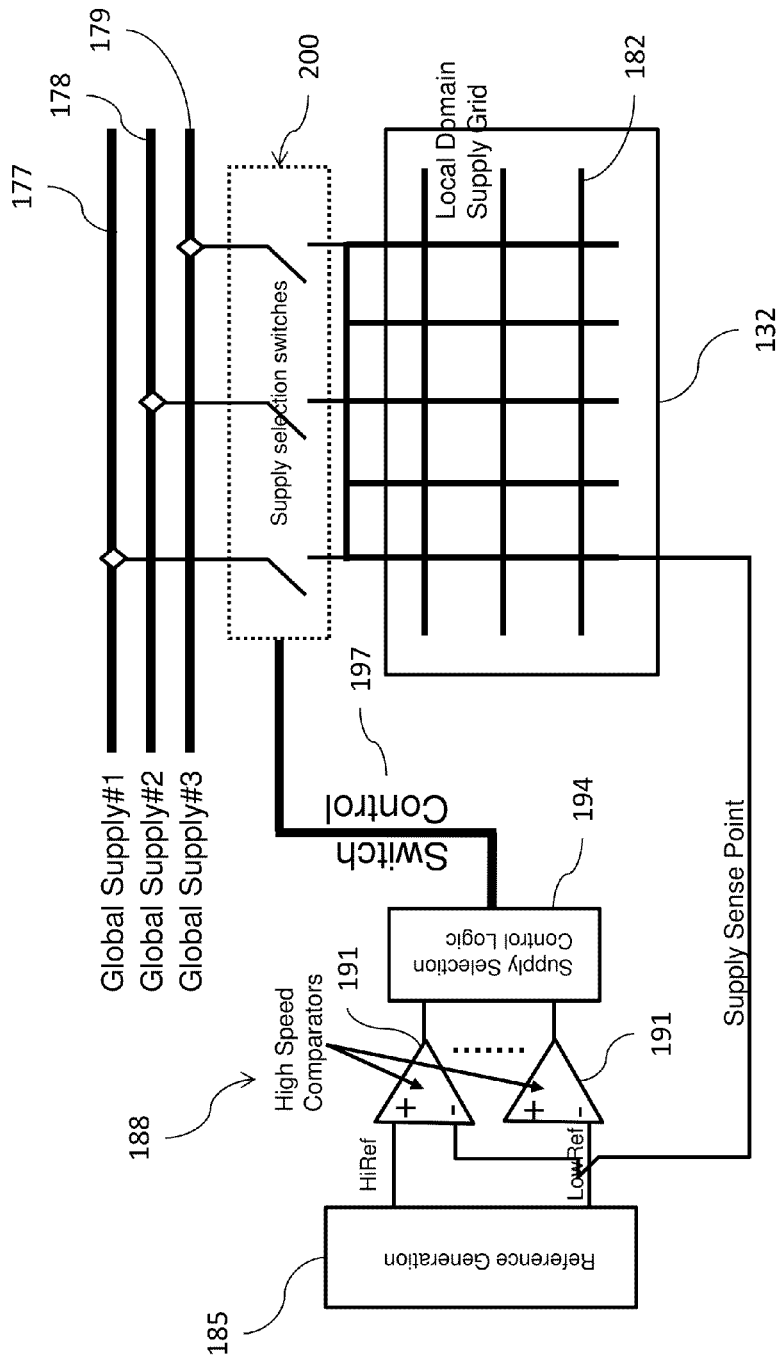
FIG. 8 is a high-level logic diagram illustrating various aspects of devices and methods herein.

FIG. 8 shows a high-level logic diagram for the voltage sensing and adjustment function. For simplicity, only three voltage input lines, Global Supply#1 177, Global Supply#2 178, Global Supply#3 179, are shown. The local logic region 132 may have a local domain supply grid 182. The Reference Generation unit 185 allows a programmable threshold that defines the maximum voltage variation for local logic region 132 before the supply voltage is adjusted. Implementation examples of the Reference Generation unit 185 include Multi-reference Bandgap or a Filtered Resistor Divider. The Comparator System, indicated generally as 188, includes multiple logical comparators 191 to determine whether the local domain supply voltage is in a High or Low window. The logical comparators 191 compare the supply voltage to a high reference and a low reference based on the programmable threshold. According to devices and methods herein, the logical comparators 191 may be implemented as "Fast comparator" architectures—i.e., High Gain Analog Differential, Gate-Source Differential, etc. The Comparator System 181 may comprise two or more logical comparators 191, which may be used to bracket the supply voltage around the high and low references. The Supply Selection Control Logic device 194 interprets the output of the comparator system 188 and provides a switch control signal 197 to an appropriate voltage supply selection switch 200. The voltage supply selection switch 200 electrically connects the local domain supply grid 182 to the appropriate Global Supply line. The Supply Selection Control Logic device 194 may comprise a combinational or a sequential circuit.

Figure 9:
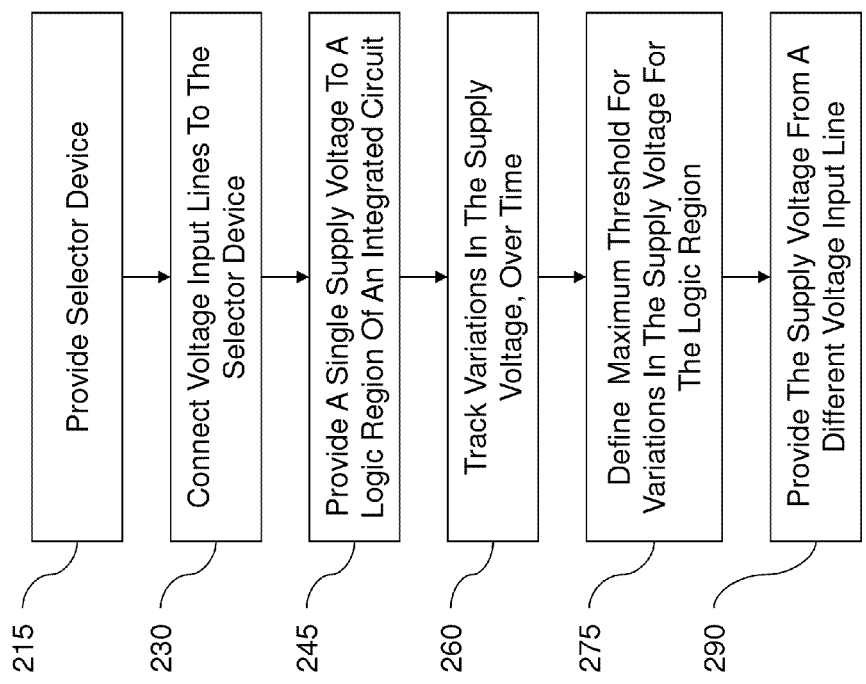
FIG. 9 is a flow diagram illustrating devices and methods herein.

FIG. 9 is a flow diagram illustrating the processing flow of an exemplary method according to devices and methods herein. At 215, a selector device, such as a multiplexer, is provided. At 230, voltage input lines are operatively connected to the inputs of the selector device. Each voltage input line provides a different voltage. The selector device provides a single supply voltage to a logic region of an integrated circuit from a currently selected voltage line of the voltage input lines, at 245. At 260, variations in the supply voltage are tracked, over time, based on operation of the logic region. A maximum threshold is defined for the variations in the supply voltage for the logic region, at 275. At 290, upon the variations in the supply voltage reaching the maximum threshold, the selector device changes which input is used in order to change the voltage line from the currently selected voltage line to a second voltage line that is different from the currently selected voltage line. In this way, the selector device provides the supply voltage from the second voltage input line, which adjusts the supply voltage for the logic region higher or lower, as necessary, while the integrated circuit is functioning.

Figure 10:
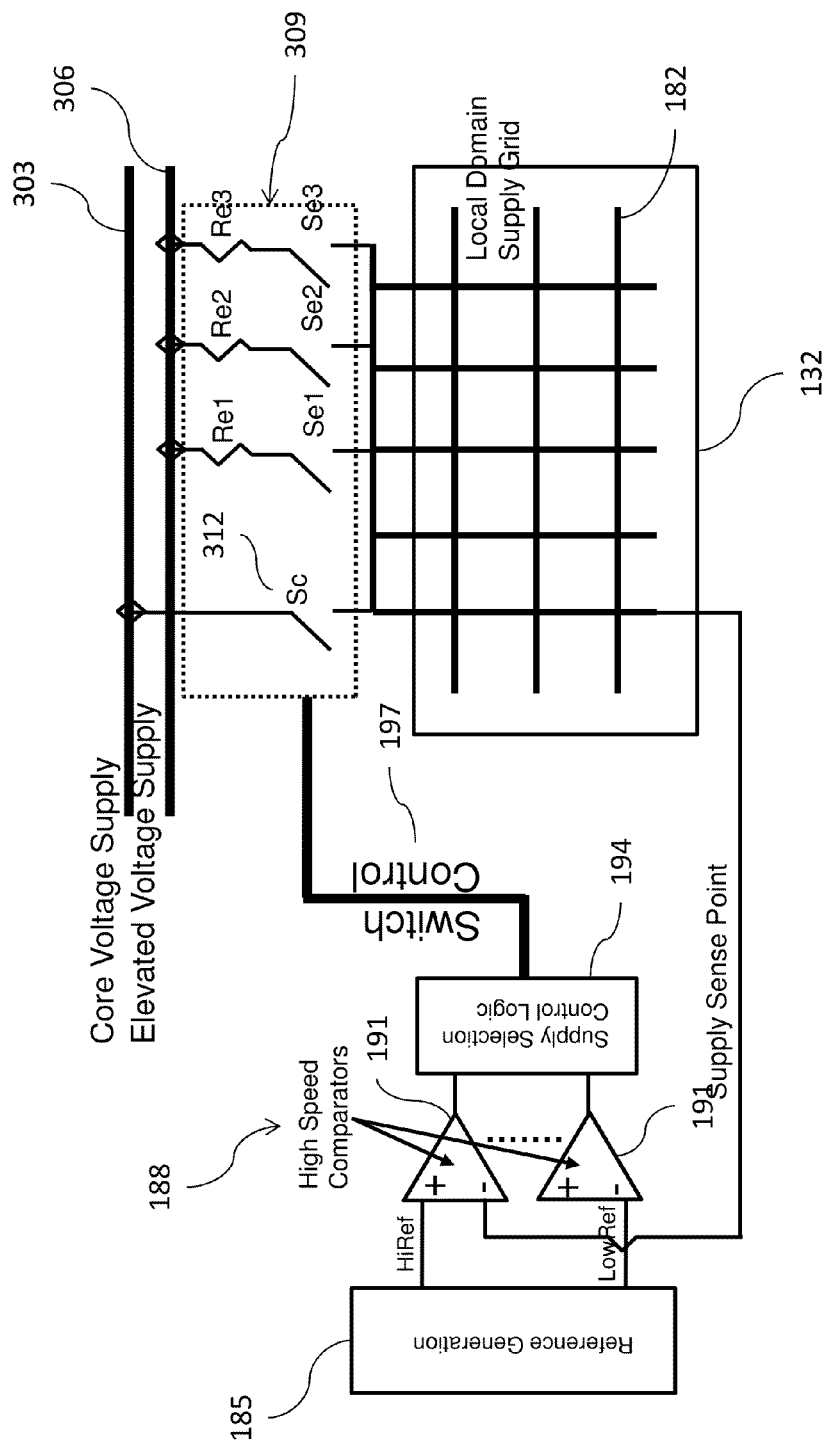
FIG. 10 is a high-level logic diagram illustrating various aspects of devices and methods herein.

FIG. 10 is similar to FIG. 8 using alternate voltage input lines. The multiple power supply rails have been replaced with a core voltage supply line 303 and single elevated voltage supply line 306. The local logic region 132 includes a local domain supply grid 182. The Reference Generation unit 185 allows a programmable threshold that defines the maximum voltage variation for local logic region 132 before the supply voltage is adjusted. The Comparator System 188 includes multiple logical comparators 191 to determine whether the local domain supply voltage needs to be changed. The Supply Selection Control Logic device 194 interprets the output of the comparator system 188 and provides a switch control signal 197 to the voltage supply switch header 309. The voltage supply switch header 309 includes switches Sc, Se1, Se2, Se3, etc. The switches in the voltage supply switch header 309 electrically connect the local domain supply grid 182 to the appropriate voltage supply line 303, 306. One header switch Sc 312 connects the local domain supply grid 182 to the core voltage supply line 303. The header switch Sc 312 is provided for power-down of the local domain supply grid 182. The voltage supply switch header 309 is sized for less than peak current draw, limits area, turn On/Off time, DI/DT at turn-on, and leakage power. Switches Se1, Se2, Se3, etc. are provided to supply additional current above the core voltage using a reduced IR drop. Each switch Se1, Se2, Se3, etc. has an associated resistor Re1, Re2, Re3, etc. The resistors Re1, Re2, Re3, etc. may be explicit or may represent the impedance of the switches. The resistance limits the current provided at an acceptable IR drop for each switch Se1, Se2, Se3, etc. The local domain supply grid 182 is connected to the elevated voltage supply line 306 as needed to negate the IR drop at high utilization. According to devices and methods herein, one or more switches Se1, Se2, Se3, etc. may be on simultaneously according to IR drop requirements.

Figure 11:
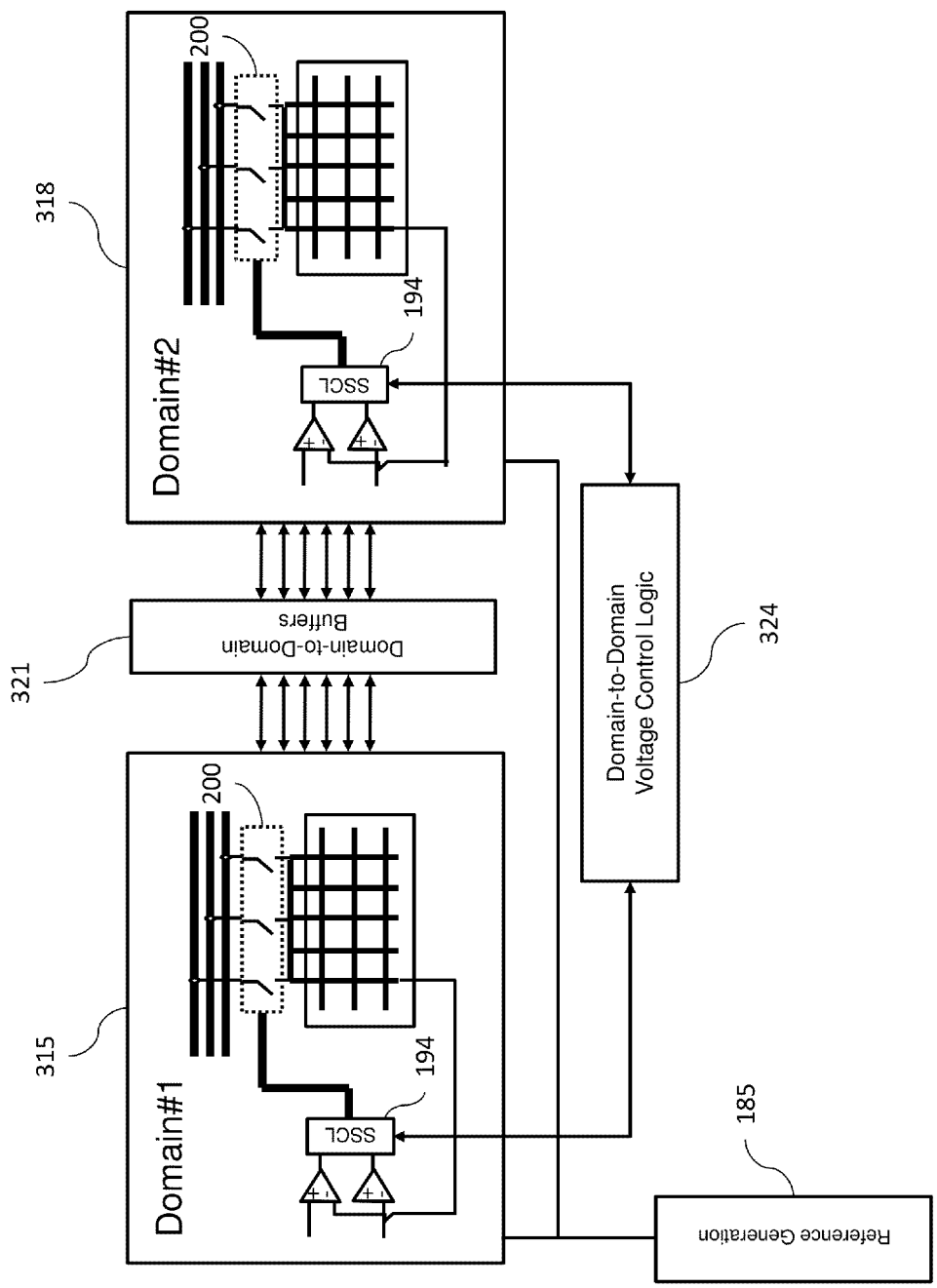
FIG. 11 is a high-level logic diagram illustrating multiple domains according to devices and methods herein.

Several real-time voltage controllers may be distributed across the chip area, such that each one controller selects an appropriate voltage for a region of logic. Each real time voltage controller, as described above, maintains the voltage of a specific logic region of the chip. During operation, each logic region may not be entirely independent of every other logic area. Referring to FIG. 11, a system may include multiple logic regions, such as Domain#1 315 and Domain#2 318. In some cases, Domain#1 315 and Domain#2 318 may share Domain-to-Domain Buffers 321. Reference Generation unit 185 allows a programmable threshold that defines the maximum variation for each local logic region before the supply voltage is adjusted. When the Domain-to-Domain Voltage Control Logic 324 detects an increase in the work being done by a particular region, it increases the voltage to that region through the Supply Selection Control Logic (SSCL) device 194 by operation of an appropriate voltage supply selection switch 200 to allow maximum performance per clock cycle. Similarly, when the Domain-to-Domain Voltage Control Logic 324 detects lower activity, it decreases the voltage to the region in order to reduce power dissipation.

According to devices and methods herein, the Domain-to-Domain voltage control logic 324 monitors the supply voltage selection made by each related SSCL device 194 to determine if selections made for Domain#1 315 and Domain#2 318 are compatible with operation of the Domain-to-Domain Buffers 321. Should the voltage selection be non-compatible, the Domain-to-Domain Voltage Control Logic 324 may override the SSCL 194 selection to provide voltages that are compatible with the minimum operation levels for both Domain#1 315 and Domain#2 318 and the voltage compatibility requirements for the Domain-to-Domain Buffers 321. In either case, each Supply Selection Control Logic (SSCL) device 194 is able to detect workload changes by monitoring the local power and provide selection control to an appropriate voltage supply selection switch 200.

For systems where the intent is to actually elevate voltages during high utilization periods, the interface may be designed to handle differences in supply. Alternatively, supply use relationships may be enforced, i.e., the voltage setting differences between two domains are limited. For systems where the intent is to minimize supply voltage differences during high utilization, no buffering or domain-to-domain limitations may be required.

Figure 12:
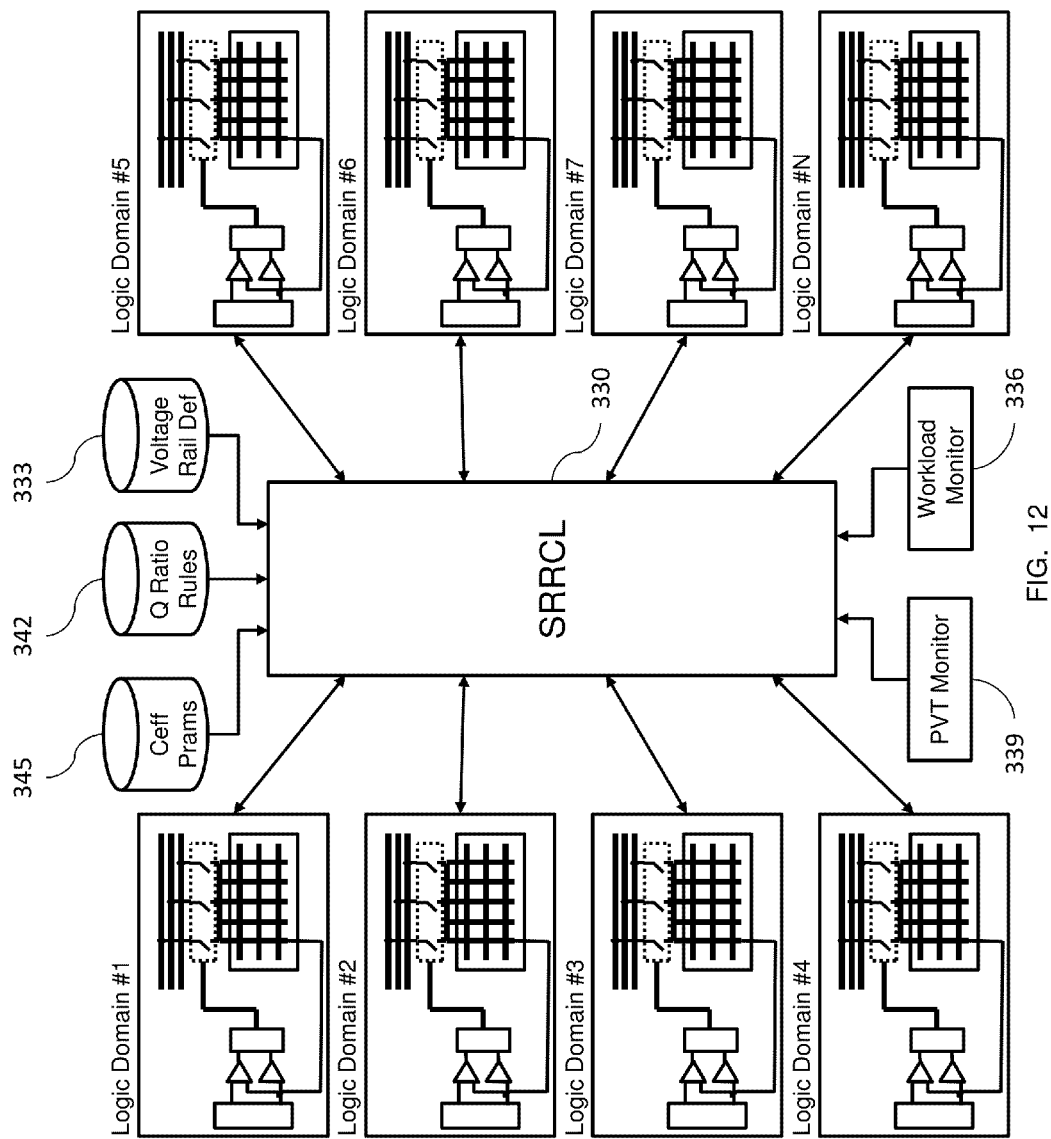
FIG. 12 is a block diagram illustrating multiple logic domains operatively connected to a centralized Supply Rail Request Control Logic (SRRCL) according to devices and methods herein.

FIG. 12 shows several logic domains operatively connected to a central controller 330 that implements the Supply Rail Request Control Logic (SRRCL). A definition for each of the voltage input lines is maintained in a voltage rail definition database 333. A workload monitor 336 detects workload changes by monitoring the local power for each logic domain. A PVT monitor 339 may evaluate process metrics in the logic domain, as well as voltage and temperature of the logic domain. (PVT stands for process, voltage, and temperature.) The PVT monitor 339 may detect environmental conditions for each domain in order to determine, based on the type of silicon (fast or slow), if the voltage can be switched from one voltage supply line to another.

The voltage demand needed to move a logic domain from one voltage supply line to another voltage supply line ($V_{sup1}$ to $V_{sup2}$) is:

$$\Delta V = (V_{sup2} - V_{sup1})$$

$$Q_{need} = C_{eff} * \Delta V$$

Where $C_{eff}$ is the effective supply capacitance for the domain. The effective supply capacitance is a function of workload/frequency, as well as a function of domain physical area and content. The charge available on the target supply line ($V_{sup2}$) is determined by:

$$Q_{avail} = \Sigma C_{eff} * V_{sup2}$$

Where $\Sigma C_{eff}$ is the effective supply capacitance for $V_{sup2}$; that is, $\Sigma C_{eff}$ is the summation of $C_{eff}$ for each logic domain associated with $V_{sup2}$, which is a function of workload/frequency for each logic domain, as well as a function of domain physical area and content of each logic domain. Supply perturbation is limited by enforcing a maximum $Q_{need}/Q_{avail}$ ratio. Such maximum ratio is stored in a Q Ratio database 342.

$C_{eff}$ may be determined for each domain through power simulation. A first method to define $C_{eff}$ is to determine $C_{effmin}$ over bounds of PVT and Workload and $C_{effmax}$ over bounds of PVT and Workload. That is, the PVT monitor 339 and workload monitor 336 evaluate environmental conditions to determine restraints on power changes, which are described in further detail below. A first method to define $C_{eff}$ is to define an equation for $C_{eff}$ for each logic domain as a function of a variety of parameters stored in Ceff parameter database 345, such as, for example, a Ceff base value, a process coefficient, a voltage coefficient, a temperature coefficient, and a frequency parameter which are made available to the central controller 330 at run time. The central controller 330 uses Ceff parameters, stored in a Prams database 345, and PVT monitor 339 parameters as available to determine Ceff.

Once determined, $C_{eff}$ for each of the domains is defined within the central controller 330 for use by the Supply Rail Request Control Logic (SRRCL). $C_{eff}$ may be maintained in a table, either fixed or loadable at run time, or calculated using a $C_{eff}$ equation implementation with parameter polling, as described above.

The Supply Rail Request Control Logic (SRRCL) in the central controller 330 implements $Q_{need}$ and $Q_{avail}$ calculations for voltage supply requests. The Q calculations may be guardbanded to insure sufficient safety margins. For example: the target voltage $Q_{avail}$ calculation would use $C_{effmin}$, while the $Q_{need}$ calculation would use $C_{effmax}$. Additionally, the Supply Rail Request Control Logic (SRRCL) in the central controller 330 implements $Q_{need}/Q_{avail}$ ratio testing for supply requests. Acceptable ratio values may be determined through simulation and fixed or loaded to the central controller 330.

As shown in FIG. 12, the central controller 330 provides coordinated control for all its connected logic domains. The central controller 330 tracks and evaluates the operating conditions for all the logic domains associated with each voltage input line 148. The RTVC 135 for each individual logic domain individually controls the voltage supply for its respective logic region 132. As the operating conditions for each logic region 132 change, the power requirements for the logic region 132 may also change. Each separate RTVC 135 sends a voltage change request to the central controller 330. The central controller 330, through the SRRCL, evaluates change requests from each RTVC 135, as well as the load on each voltage input line 148. If operating and environmental conditions permit, the central controller 330 grants permission to the RTVC 135 to change its supply voltage for its logic region 132. During periods of high utilization, it may not be advantageous to switch the voltage supply for particular logic regions due to operating conditions, such as temperature and switching noise, as well as the finite amount of time for actual switching. The central controller 330, through the SRRCL, may deny permission for the RTVC 135 to change the supply voltage. In some instances, the central controller 330 may grant permission to the RTVC 135 to change the voltage supply by incrementally stepping through intermediate voltages toward a destination voltage.

In other words, the central controller 330 responds to change request in one of three ways: the central controller 330 grants permission to change the supply voltage for the logic region to a destination voltage; the central controller 330 grants permission to change the supply voltage for the logic region in incremental steps toward the destination voltage; or the central controller 330 denies permission to change the supply voltage.

Figure 13:
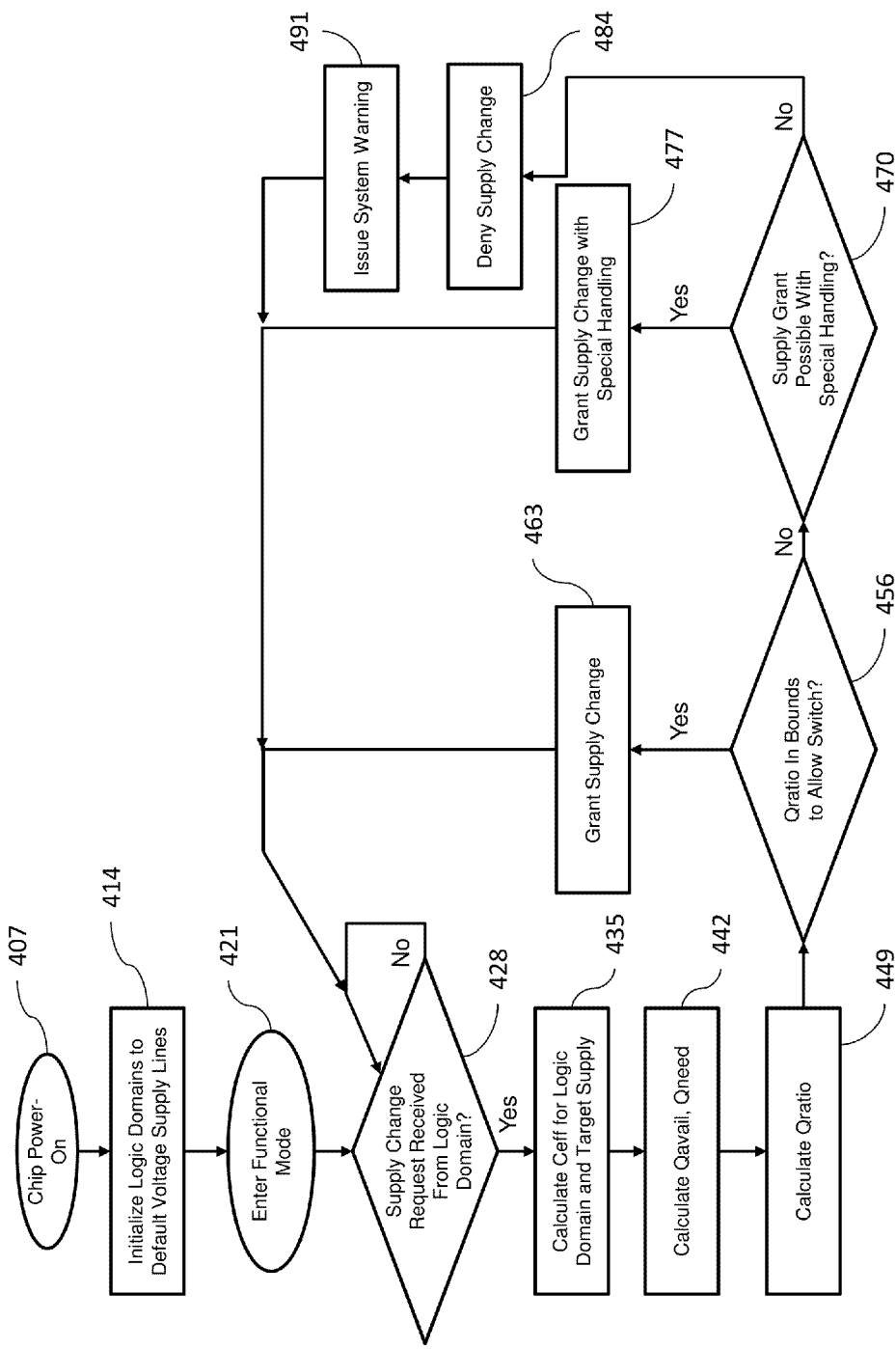
FIG. 13 is a flow diagram illustrating devices and methods herein.

FIG. 13 is a flow diagram illustrating exemplary processing control flow according to the Supply Rail Request Control Logic (SRRCL) in the central controller 330. At 407, power is turned on to the chip. As described above, the chip is partitioned into logic regions or domains. Each logic region is initialized to a default voltage supply line, at 414. At 421, the SRRCL enters the functional mode. When a voltage supply change request is received from a logic region, at 428, the SRRCL determines $C_{eff}$ for the logic region and for the target voltage supply, at 435. The SRRCL also calculates $Q_{need}$ and $Q_{avail}$, at 442, and the Q ratio, at 449. At 456, the SRRCL determines if the Q ratio is within the bounds according to the rules stored in a Q Ratio database 342. If, at 456, the Q ratio is within the bounds, the SRRCL grants the voltage supply change request, at 463. If, at 456, the Q ratio is not within the bounds, the SRRCL determines if it is possible to grant the voltage supply change request using special handling, at 470. (The special handling process, which uses incremental steps toward the destination voltage, is described in more detail below.) If, at 470, the SRRCL determines it is possible to use special handling, the SRRCL grants the voltage supply change request with special handling, at 477. If, at 470, the SRRCL determines it is not possible to use special handling, the SRRCL denies the voltage supply change request, at 484, and issues a system warning, at 491.

Figure 14:
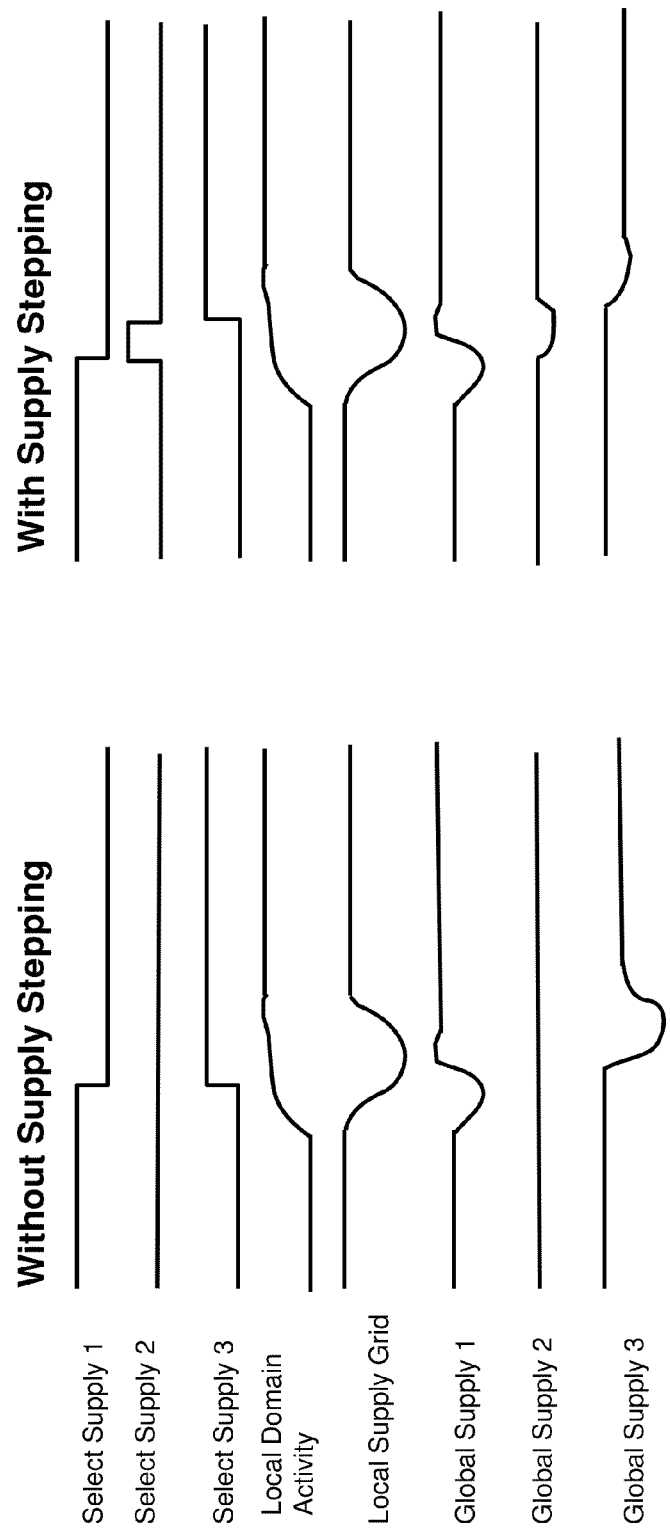
FIG. 14 is a timing diagram illustrating various aspects of devices and methods herein.

Referring to FIG. 14—the left side of the figure shows the effect on the global supply lines of a voltage change in a single step, the right side of the figure shows the effect on the global supply lines of a voltage change in a multiple steps. As shown on the left, the Comparator System 188 detects a voltage change requirement due to an increase in local domain activity causing a reduction in the local supply grid voltage. The system causes a change from Select Supply 1 to Select Supply 3, which is made in single step. Global Supply 3 pulls down due to supply impedance, causing an increase in current to make up for current/voltage deficit. Other circuits on Global Supply 3 also see a voltage reduction. As shown on the right, the Comparator System 188 detects a voltage change requirement due to an increase in local domain activity causing a reduction in the local supply grid voltage. The system causes a change from Select Supply 1 to Select Supply 3, which is made in two steps, using Select Supply 2 as an intermediate supply. Global Supply 3 pulls down is reduced as a portion of charge was sourced from Global Supply 2. The effect on other circuits on Global Supply 3 also reduced.

Figure 15:
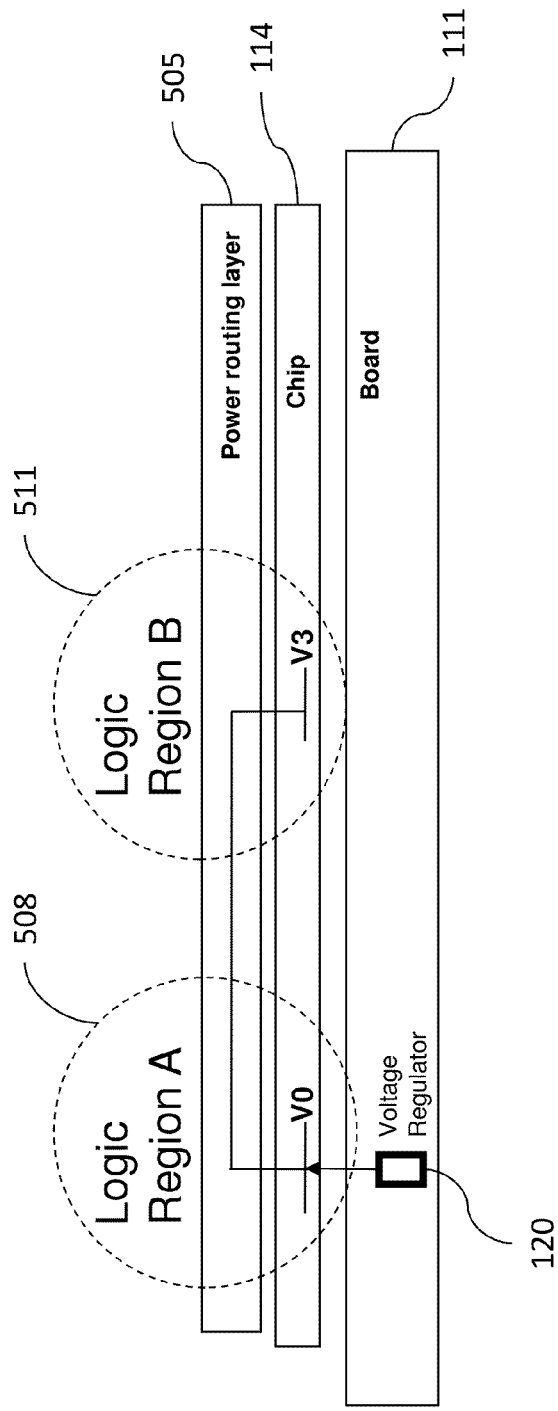
FIG. 15 is a block diagram illustrating additional aspects of devices and methods herein.

FIG. 15 illustrates a system view of power rail re-assignment with chip stacking and through silicon via (TSV) structures. FIG. 15 shows a side view of the semiconductor device of FIG. 1 having the board 111 with the chip 114 thereon. In some systems, a face-to-face design may use the upper layer 505 for power routing. Power can be routed from a single voltage regulator 120 up one rail using a TSV, or other appropriate device, through a programmable voltage rail in the upper layer 505, back down to another region of the primary logic chip, through another TSV. According to devices and methods herein, this connection can be dynamic, and also might be optimized during wafer final assembly to match parts on a processing performance identification step. As shown in FIG. 15, a single voltage regulator 120 provides the V0 power plane of Logic Region A 508. Chip stacking is used to route this voltage through the upper layer 505 to the V3 power input of Logic Region B 511. In this manner, a single voltage regulator can be routed to any desired power plane(s) of different logic regions.

Figure 16:
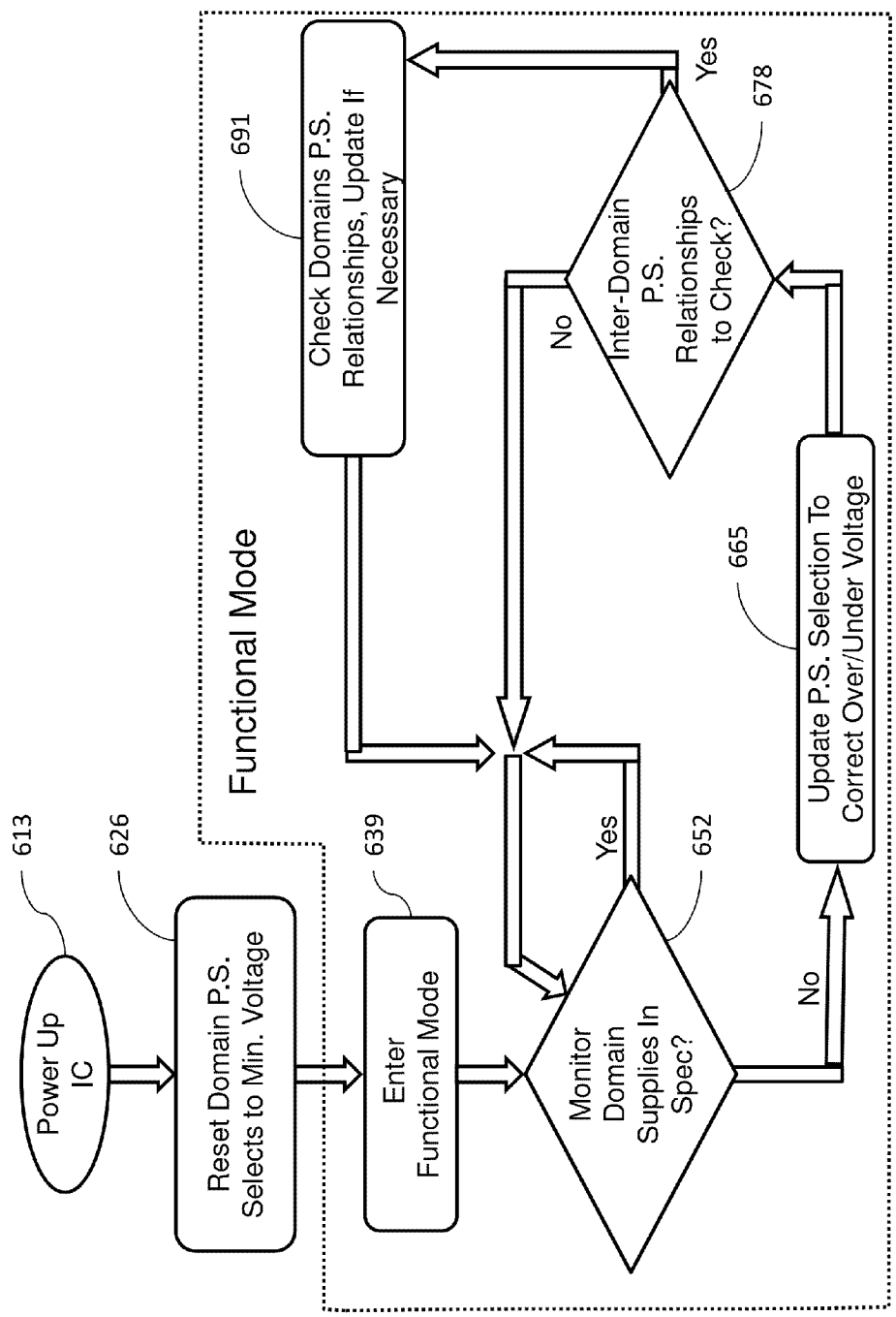
FIG. 16 is a flow diagram illustrating devices and methods herein.

FIG. 16 is a flow diagram illustrating an exemplary power-up and operation process for an integrated circuit (IC) according to devices and methods herein. At 613, the IC is powered up. At 626, the power supply selection for all the logic regions is reset to minimum voltage. At 639, the system enters the functional mode. The controller monitors the power supply for each logic region and determines if the voltage is within specification, at 652. If, at 652, the voltage for a logic region is not within specification, the power supply to the logic region is updated, at 665, to correct over or under voltage, as described above. At 678, the system determines if there are required relationships between inter-domain power supplies, which must be checked by Domain-to-Domain Voltage Control Logic 324 in FIG. 11. If, at 678, there are relationships to check, at 691, such relationships are checked and updated, and power supply selections for the two domains are updated, if necessary, to satisfy minimum voltage and inter-domain voltage relationships.

The method as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

For electronic applications, semiconducting substrates, such as silicon wafers, can be used. The substrate enables easy handling of the micro device through the many fabrication steps. Often, many individual devices are made together on one substrate and then singulated into separated devices toward the end of fabrication. In order to fabricate a microdevice, many processes are performed, one after the other, many times repeatedly. These processes typically include depositing a film, patterning the film with the desired micro features, and removing (or etching) portions of the film. For example, in memory chip fabrication, there may be several lithography steps, oxidation steps, etching steps, doping steps, and many others are performed. The complexity of microfabrication processes can be described by their mask count.

An integrated circuit structure according to devices and methods herein may include a semiconductor comprising logic regions and dynamically adjustable voltage controllers. Each of the voltage controllers is operatively connected to one of the logic regions to enable voltage adjustment while the chip is operating in normal functional mode. Each of the voltage controllers comprises a selector device having a plurality of inputs and a single output. Voltage input lines are operatively connected to the inputs of the selector device. Each of the voltage input lines provides a different voltage. A voltage sensing device is operatively connected to the single output of the selector device. The single output provides a supply voltage to the one of the logic regions. A control circuit that dynamically monitors the local voltage is operatively connected to the selector device. The voltage sensing device senses the supply voltage. The control circuit captures and stores a digital representation of the supply voltage during each cycle of a clock. The control circuit tracks variations in the supply voltage over time based on operation of the one of the logic regions. Responsive to the variations in the supply voltage exceeding an operational threshold of the one of the logic regions, the control circuit submits a request signal to a central controller. When the central controller grants permission, the control circuit dynamically adjusts the supply voltage by enabling the selector device to choose a different voltage input line to adjust the supply voltage up or down.

Aspects of the present disclosure are described herein with reference to flowchart illustrations and/or block diagrams of methods, apparatus (systems), and computer program products according to various devices and methods. It will be understood that each block of the flowchart illustrations and/or two-dimensional block diagrams, and combinations of blocks in the flowchart illustrations and/or block diagrams, can be implemented by computer program instructions. The computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

According to a further system and method herein, an article of manufacture is provided that includes a tangible computer readable medium having computer readable instructions embodied therein for performing the steps of the computer implemented methods, including, but not limited to, the method illustrated in FIG. 9. Any combination of one or more computer readable non-transitory medium(s) may be utilized. The computer readable medium may be a computer readable signal medium or a computer readable storage medium. The non-transitory computer storage medium stores instructions, and a processor executes the instructions to perform the methods described herein. A computer readable storage medium may be, for example, but not limited to, an electronic, magnetic, optical, electromagnetic, infrared, or semiconductor system, apparatus, or device, or any suitable combination of the foregoing. Any of these devices may have computer readable instructions for carrying out the steps of the methods described above with reference to FIG. 9.

The computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Furthermore, the computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In case of implementing the devices and methods herein by software and/or firmware, a program constituting the software may be installed into a computer with dedicated hardware, from a storage medium or a network, and the computer is capable of performing various functions if with various programs installed therein.

Figure 17:
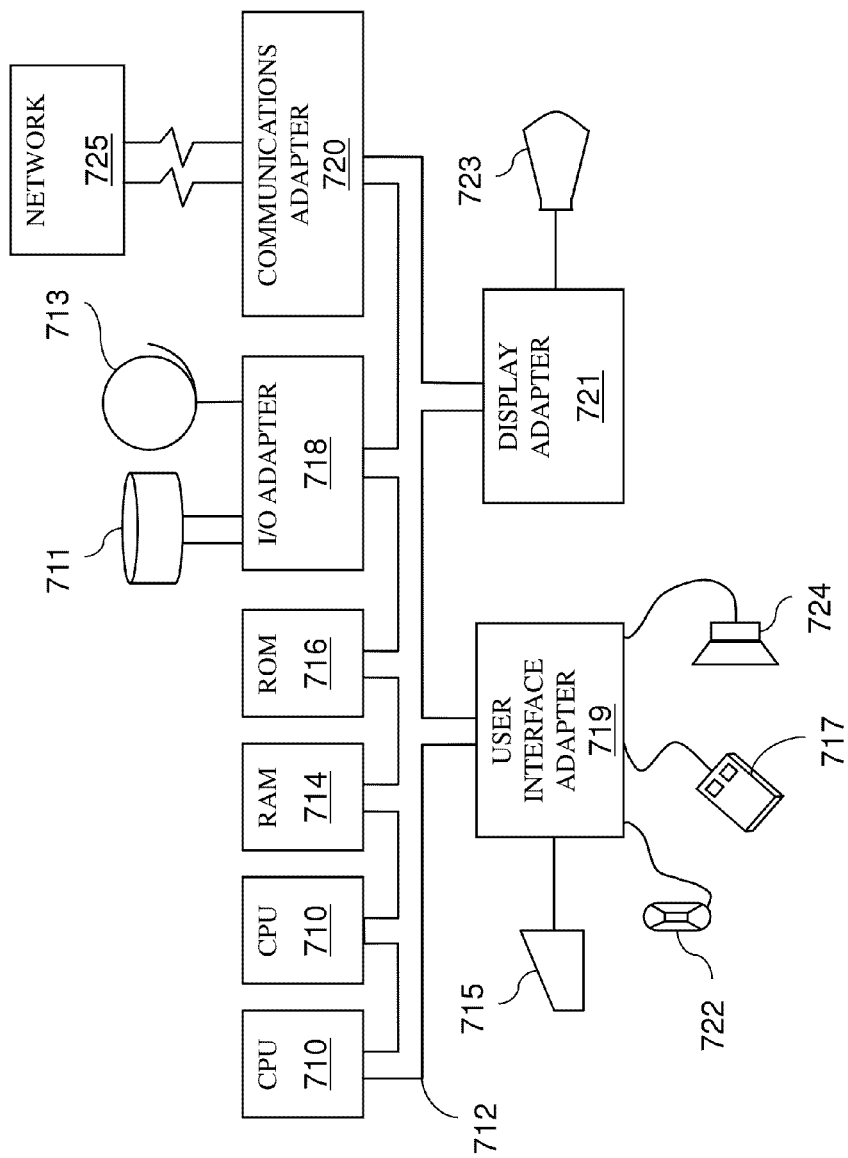
FIG. 17 is a schematic diagram of a hardware system according to devices and methods herein.

A representative hardware environment for practicing the devices and methods herein is depicted in FIG. 17. This schematic drawing illustrates a hardware configuration of an information handling/computer system in accordance with the devices and methods herein. The system comprises at least one processor or central processing unit (CPU) 710. The CPUs 710 are interconnected via system bus 712 to various devices such as a Random Access Memory (RAM) 714, Read-Only Memory (ROM) 716, and an Input/Output (I/O) adapter 718. The I/O adapter 718 can connect to peripheral devices, such as disk units 711 and tape drives 713, or other program storage devices that are readable by the system. The system can read the inventive instructions on the program storage devices and follow these instructions to execute the methodology of the devices and methods herein.

In FIG. 17, CPUs 710 perform various processing based on a program stored in a Read Only Memory (ROM) 716 or a program loaded from a peripheral device, such as disk units 711 and tape drives 713 to a Random Access Memory (RAM) 714. In the RAM 714, required data when the CPUs 710 perform the various processing or the like is also stored, as necessary. The CPUs 710, the ROM 716, and the RAM 714 are connected to one another via a bus 712. An I/O adapter 718 is also connected to the bus 712 to provide an input/output interface, as necessary. A removable medium, such as a magnetic disk, an optical disk, a magneto-optical disk, a semiconductor memory, or the like, is installed on the peripheral device, as necessary, so that a computer program read therefrom may be installed into the RAM 714, as necessary.

The system further includes a user interface adapter 719 that connects a keyboard 715, mouse 717, speaker 724, microphone 722, and/or other user interface devices such as a touch screen device (not shown) to the bus 712 to gather user input. Additionally, a communication adapter 720 including a network interface card such as a LAN card, a modem, or the like connects the bus 712 to a data processing network 725. The communication adapter 720 performs communication processing via a network such as the Internet. A display adapter 721 connects the bus 712 to a display device 723, which may be embodied as an output device such as a monitor (such as a Cathode Ray Tube (CRT), a Liquid Crystal Display (LCD), or the like), printer, or transmitter, for example.

In the case where the above-described series of processing is implemented with software, the program that constitutes the software may be installed from a network such as the Internet or a storage medium such as the removable medium.

Those skilled in the art would appreciate that the storage medium is not limited to the peripheral device having the program stored therein as illustrated in FIG. 17, which is distributed separately from the device for providing the program to the user. Examples of a removable medium include a magnetic disk (including a floppy disk), an optical disk (including a Compact Disk-Read Only Memory (CD-ROM) and a Digital Versatile Disk (DVD)), a magneto-optical disk (including a Mini-Disk (MD) (registered trademark)), and a semiconductor memory. Alternatively, the storage medium may be the ROM 716, a hard disk contained in the storage section of the disk units 711, or the like, which has the program stored therein and is distributed to the user together with the device that contains them.

As will be appreciated by one skilled in the art, aspects of the devices and methods herein may be embodied as a system, method, or computer program product. Accordingly, aspects of the present disclosure may take the form of an entirely hardware system, an entirely software system (including firmware, resident software, micro-code, etc.) or an system combining software and hardware aspects that may all generally be referred to herein as a "circuit," "module", or "system." Furthermore, aspects of the present disclosure may take the form of a computer program product embodied in one or more computer readable medium(s) having computer readable program code embodied thereon.

Any combination of one or more computer readable non-transitory medium(s) may be utilized. The computer readable medium may be a computer readable signal medium or a computer readable storage medium. The non-transitory computer storage medium stores instructions, and a processor executes the instructions to perform the methods described herein. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a Read-Only Memory (ROM), an Erasable Programmable Read-Only Memory (EPROM or Flash memory), an optical fiber, a magnetic storage device, a portable compact disc Read-Only Memory (CD-ROM), an optical storage device, a "plug-and-play" memory device, like a USB flash drive, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowchart and block diagrams in the Figures illustrate the architecture, functionality, and operation of possible implementations of systems, methods, and computer program products according to various devices and methods herein. In this regard, each block in the flowchart or block diagrams may represent a module, segment, or portion of code, which comprises one or more executable instructions for implementing the specified logical function(s). It should also be noted that, in some alternative implementations, the functions noted in the block might occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular devices and methods only and is not intended to be limiting of this disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements).

The corresponding structures, materials, acts, and equivalents of all means or step plus function elements in the claims below are intended to include any structure, material, or act for performing the function in combination with other claimed elements as specifically claimed. The descriptions of the various devices and methods herein have been presented for purposes of illustration, but are not intended to be exhaustive or limited to the devices and methods disclosed. Many modifications and variations will be apparent to those of ordinary skill in the art without departing from the scope and spirit of the described devices and methods. The terminology used herein was chosen to best explain the principles of the devices and methods, the practical application or technical improvement over technologies found in the marketplace, or to enable others of ordinary skill in the art to understand the devices and methods disclosed herein.

What is claimed is:

1. A semiconductor device comprising:
  logic regions; and
  voltage controllers, each of said voltage controllers being operatively connected to one of said logic regions and independently controlling a supply voltage to said one of said logic regions, and each of said voltage controllers comprising:
    a selector device having inputs and a single output;
    voltage input lines operatively connected to said inputs of said selector device, at least two of said voltage input lines providing different voltages;
    a voltage sensing device operatively connected to said single output of said selector device, said single output providing said supply voltage from a first voltage input line of said voltage input lines to said one of said logic regions; and
    a control circuit operatively connected to said selector device,
      said voltage sensing device sensing said supply voltage,
      said control circuit capturing and storing a digital representation of said supply voltage during each cycle of a clock,
      said control circuit tracking variations in said supply voltage over time, based on operation of said one of said logic regions, and
      responsive to said variations in said supply voltage exceeding an operational threshold of said one of said logic regions, said control circuit enabling said selector device to choose a second voltage input line of said voltage input lines that is different from said first voltage input line to adjust said supply voltage.

2. The semiconductor device according to claim 1, said control circuit further comprising:
  capture registers storing a digital representation of said supply voltage during each cycle of said clock; and
  a programmable threshold register, storing a value representing said operational threshold for said one of said logic regions, said operational threshold indicating a maximum amount that said supply voltage can vary before said control circuit adjusts said supply voltage.

3. The semiconductor device according to claim 1, each of said voltage controllers further comprising:
  a comparator system comprising logical comparators operatively connected to a reference generation unit and a supply selection control logic device,
  said reference generation unit providing a programmable threshold value that defines a maximum voltage variation for said one of said logic regions,
  said logical comparators comparing said supply voltage to a high reference and a low reference based on said programmable threshold, and
  said supply selection control logic device interpreting an output of said comparator system and providing a switch control signal to said selector device.

4. The semiconductor device according to claim 1, said selector device further comprising voltage supply selection switches operatively connected between said inputs and said single output, a voltage supply selection switch being connected to each of said voltage input lines, said control circuit providing a switch control signal to said voltage supply selection switches to electrically connect a voltage input line to said one of said logic regions.

5. The semiconductor device according to claim 1, further comprising:
  a power routing layer operatively connected to two or more logic regions, said voltage sensing device providing a same supply voltage to each of said two or more logic regions through said power routing layer.

6. The semiconductor device according to claim 1, further comprising a central controller operatively connected to said logic regions and said voltage controllers, said central controller coordinating actions of said voltage controllers,
  responsive to said variations in said supply voltage exceeding an operational threshold of said one of said logic regions, said control circuit outputting a change request to said central controller to obtain permission to choose a second voltage input line of said voltage input lines that is different from said first voltage input line to adjust said supply voltage for said one of said logic regions.

7. The semiconductor device according to claim 6, said central controller monitoring change requests from said control circuit and operating conditions of said logic regions,
  said central controller enabling said voltage controllers to adjust said supply voltage to said logic regions based on evaluation of said operating conditions of said logic regions and evaluation of loads on said voltage input lines.

8. The semiconductor device according to claim 1, said control circuit dynamically adjusting said supply voltage to said one of said logic regions while said one of said logic regions maintains operation.

9. A voltage control system, comprising:
  logic regions;
  voltage controllers, each of said voltage controllers being operatively connected to one of said logic regions and independently controlling a supply voltage to said one of said logic regions, and
  a central controller operatively connected to said logic regions and said voltage controllers, said central controller coordinating actions of said voltage controllers,
  each of said voltage controllers comprising:
    a selector device having inputs and a single output;
    voltage input lines operatively connected to said inputs of said selector device, at least two of said voltage input lines providing different voltages;
    a voltage sensing device operatively connected to said single output of said selector device, said single output providing said supply voltage from a first voltage input line of said voltage input lines to said one of said logic regions; and
    a control circuit operatively connected to said selector device,
      said voltage sensing device sensing a voltage of said single output,
      said control circuit capturing and storing a digital representation of said voltage during each cycle of a clock,
      said control circuit tracking variations in said voltage over time, based on operation of said one of said logic regions, and
      responsive to said variations in said voltage exceeding a threshold, said control circuit outputting a change request to said central controller to obtain permission for selecting a different voltage input line to change said supply voltage for said one of said logic regions
      said central controller enabling said selector device to choose a second voltage input line of said voltage input lines that is different from said first voltage input line to adjust said voltage based on evaluation of operating conditions of said logic regions and evaluation of loads on said voltage input lines.

10. The voltage control system according to claim 9, said control circuit further comprising:
  capture registers storing a digital representation of said voltage of said single output during each cycle of said clock; and
  a programmable threshold register, storing a value representing said threshold, said threshold indicating a maximum amount that said voltage of said single output can vary before said control circuit adjusts said voltage of said single output.

11. The voltage control system according to claim 9, further comprising:
  a comparator system comprising logical comparators operatively connected to a reference generation unit and a supply selection control logic device,
  said reference generation unit providing a programmable threshold value that defines a maximum voltage variation for said single output,
  said logical comparators comparing said voltage to a high reference and a low reference based on said threshold, and
  said supply selection control logic device interpreting an output of said comparator system and providing a switch control signal to said selector device.

12. The voltage control system according to claim 9, said selector device further comprising voltage supply selection switches operatively connected between said inputs and said single output, a voltage supply selection switch being connected to each of said voltage input lines, said control circuit providing a switch control signal to said voltage supply selection switches to electrically connect a voltage input line to said single output.

13. A method, comprising:
  providing voltage input lines operatively connected to inputs of voltage selector devices, at least two of said voltage input lines providing different voltages;
  each voltage selector device independently providing a supply voltage to a logic region of an integrated circuit from a first voltage input line of said voltage input lines;
  storing a digital representation of said supply voltage in a capture register during each cycle of a clock;
  tracking variations in said supply voltage over time based on operation of said logic region;
  defining a threshold for said variations in said supply voltage for said logic region;
  storing a programmable value representing said threshold in a threshold register, said threshold indicating a maximum amount that said supply voltage can vary before adjusting said supply voltage; and
  upon said variations in said supply voltage reaching said threshold, said voltage selector device providing said supply voltage from a second voltage input line of said voltage input lines that is different from said first voltage input line to adjust said supply voltage for said logic region.

14. The method according to claim 13, further comprising:
  responsive to said variations in said supply voltage reaching said threshold, outputting a change request to a central controller operatively connected to said voltage selector devices to obtain permission to adjust said supply voltage for said logic region.

15. The method according to claim 14, further comprising:
  upon receiving permission from said central controller, said voltage selector device choosing a second voltage input line of said voltage input lines that is different from said first voltage input line to adjust said supply voltage.

16. The method according to claim 14, further comprising:
  said central controller monitoring change requests and operating conditions of logic regions operatively connected to said central controller and coordinating actions of said voltage selector devices.

17. The method according to claim 16, further comprising:
said central controller evaluating said operating conditions of said logic regions and evaluating loads on said voltage input lines, and
responsive to each change request, said central controller one of:
   granting permission to change said supply voltage for said logic region to a destination voltage;
   granting permission to change said supply voltage for said logic region in incremental steps toward said destination voltage; and
   denying permission.

18. The method according to claim 13, further comprising:
comparing said supply voltage to a high reference and a low reference based on said threshold, and
providing a switch control signal to said voltage selector device based on said comparing.

19. The method according to claim 13, further comprising:
adjusting said supply voltage to said logic region while said logic region maintains operation.

\* \* \* \* \*